US010059872B2

(12) United States Patent
Janak et al.

(10) Patent No.: US 10,059,872 B2
(45) Date of Patent: Aug. 28, 2018

(54) CORROSION INHIBITOR COMPOSITIONS FOR ACIDIZING TREATMENTS

(71) Applicant: Lonza Inc., Allendale, NJ (US)

(72) Inventors: Kevin E. Janak, Blauvelt, NY (US); Sarah Tannenbaum, Monroe, NY (US)

(73) Assignee: Lonza Inc., Allendale, NJ (US)

( * ) Notice: Subject to any disclaimer, the term of this patent is extended or adjusted under 35 U.S.C. 154(b) by 0 days.

(21) Appl. No.: 14/968,265

(22) Filed: Dec. 14, 2015

(65) Prior Publication Data

US 2016/0177170 A1  Jun. 23, 2016

Related U.S. Application Data

(60) Provisional application No. 62/095,440, filed on Dec. 22, 2014.

(51) Int. Cl.
| | |
|---|---|
| *C09K 8/54* | (2006.01) |
| *C23F 11/04* | (2006.01) |
| *C09K 8/74* | (2006.01) |
| *C09K 8/86* | (2006.01) |
| *C23F 11/14* | (2006.01) |
| *C23F 11/12* | (2006.01) |
| *C09K 8/52* | (2006.01) |

(52) U.S. Cl.
CPC ............... *C09K 8/54* (2013.01); *C09K 8/74* (2013.01); *C09K 8/86* (2013.01); *C23F 11/04* (2013.01); *C23F 11/128* (2013.01); *C23F 11/149* (2013.01); *C09K 8/52* (2013.01)

(58) Field of Classification Search
None
See application file for complete search history.

(56) References Cited

U.S. PATENT DOCUMENTS

| | | | |
|---|---|---|---|
| 3,083,138 A * | 3/1963 | Schulz | 424/626 |
| 3,320,263 A * | 5/1967 | Wakeman | A61K 8/416 106/18.31 |
| 3,531,409 A | 9/1970 | Seffens et al. | |
| 3,676,354 A | 7/1972 | Kaneko et al. | |
| 4,104,174 A | 8/1978 | Merchant, Jr. et al. | |
| 4,220,785 A | 9/1980 | Alink et al. | |
| 4,493,775 A | 1/1985 | Coffey et al. | |
| 4,676,834 A | 6/1987 | Treybig | |
| 4,950,685 A | 8/1990 | Ward | |
| 5,009,799 A | 4/1991 | Syrinek et al. | |
| 5,102,874 A * | 4/1992 | Lintner | A01N 57/34 514/129 |
| 5,300,235 A | 4/1994 | Clewlow et al. | |
| 5,336,441 A | 8/1994 | Shah et al. | |
| 5,427,999 A | 6/1995 | Clewlow et al. | |
| 5,441,929 A | 8/1995 | Walker | |
| 6,375,727 B1 | 4/2002 | Walker | |
| 6,620,341 B1 | 9/2003 | Verma et al. | |
| 6,846,777 B2 | 1/2005 | Antoni-Zimmermann et al. | |
| 7,056,919 B2 | 6/2006 | Ross et al. | |
| 7,651,982 B2 | 1/2010 | Cassidy et al. | |
| 7,851,414 B2 | 12/2010 | Yang et al. | |
| 8,585,930 B2 | 11/2013 | Tiwari | |
| 8,618,027 B2 | 12/2013 | Meyer et al. | |
| 2003/0073602 A1* | 4/2003 | Ramirez, Jr. | C11D 3/0026 510/421 |
| 2003/0199490 A1 | 10/2003 | Antoni-Zimmermann et al. | |
| 2004/0248973 A1* | 12/2004 | Ross | A01N 41/10 514/483 |
| 2005/0124674 A1 | 6/2005 | Antoni-Zimmermann et al. | |
| 2006/0194700 A1 | 8/2006 | Gatlin et al. | |
| 2007/0036832 A1* | 2/2007 | Williams | A01N 47/12 424/405 |
| 2007/0166340 A1* | 7/2007 | Stringfellow | A01N 25/00 424/405 |
| 2008/0146464 A1 | 6/2008 | Malwitz | |
| 2009/0131285 A1 | 5/2009 | Wang et al. | |
| 2009/0221455 A1 | 9/2009 | Ke et al. | |
| 2010/0261623 A1 | 10/2010 | Cassidy et al. | |
| 2012/0149608 A1 | 6/2012 | Meyer et al. | |
| 2012/0238479 A1 | 9/2012 | Choudhary et al. | |
| 2013/0112106 A1 | 5/2013 | Malwitz et al. | |
| 2013/0233543 A1 | 9/2013 | Overkempe et al. | |
| 2013/0281329 A1 | 10/2013 | De Wolf et al. | |
| 2014/0076567 A1 | 3/2014 | Meyer et al. | |
| 2014/0091262 A1 | 4/2014 | Webber et al. | |
| 2014/0119984 A1 | 5/2014 | Belakshe et al. | |

FOREIGN PATENT DOCUMENTS

| | | |
|---|---|---|
| EP | 0390317 | 10/1990 |
| EP | 0898605 | 11/1998 |
| WO | WO 2012/120143 | 9/2012 |

OTHER PUBLICATIONS

International Search Report and Written Opinion to PCT/US2015/065536, dated Mar. 3, 2016.
International Preliminary Report on Patentability for PCT/US2015/065536 dated Jun, 27, 2017, 10 pages.
Wong Thesis, Electrochemical behaviour of quaternary pyridinium compounds and their interaction with electrode surfaces, 1998.

* cited by examiner

Primary Examiner — Jeffrey D Washville
(74) Attorney, Agent, or Firm — Dority & Manning, P.A.

(57) ABSTRACT

A corrosion inhibitor composition and a method of inhibiting corrosion on a surface are disclosed. The corrosion inhibitor composition includes at least one nitrogen containing heteroaromatic compound and at least one haloalkynyl carbamate compound. The corrosion inhibitor composition may be utilized with acidizing treatments for wells, in particular for the production of oil, gas, and/or water.

27 Claims, No Drawings

CORROSION INHIBITOR COMPOSITIONS FOR ACIDIZING TREATMENTS

RELATED APPLICATIONS

The present application claims priority to and the filing benefit to U.S. Provisional Patent Application No. 62/095,440 having a filing date of Dec. 22, 2014 and which is hereby incorporated by reference in its entirety.

BACKGROUND

Acid stimulation is commonly employed to increase the permeability of subterranean formations for oil, gas, and water wells. In particular, these stimulation techniques include matrix acidizing and acid fracturing. In matrix acidizing, an acid typically permeates into channels without inducing any fractures within the formation. However, with acid fracturing, the fluid is supplied with sufficient pressure to induce fractures in the formation. Regardless, both techniques employ acids to dissolve and remove minerals, such as limestone and sand, from the formations thereby allowing fluids to flow into the wells.

Some of the acids commonly employed for these acidizing treatments including hydrochloric acid, hydrofluoric acid, acetic acid, citric acid, and mixtures thereof. However, employing such acids tends to increase the rate of corrosion of the equipment employed in such processes. The corrosion can also occur due to the presence of other chemical agents, including hydrogen sulfide, brines, carbon dioxide, and other acids, and other matter, including sand, rocks, and microorganisms.

Additionally, the corrosion can be exacerbated by the elevated temperatures and pressures typically encountered in deeper formations. Therefore, corrosion of equipment employed in these acidizing processes can lead to extraordinary costs for repair and/or replacement.

To inhibit corrosion, corrosion inhibitors can be employed. Corrosion inhibitors may be formed as a coating on a surface which comes into contact with corrosive agents and/or can be employed in production lines, pipelines, etc. with the acidizing solutions. Some of these corrosion inhibitors include formaldehyde-containing Mannich bases, fatty acid derivatives, and dodecyl benzene sulfonic acid. However, various problems, including toxicity, environmental concerns, and costs, exist with current corrosion inhibitors.

Accordingly, there is a need for an improved corrosion inhibitor composition for inhibiting corrosion on a surface. In particular, there is a need for such inhibition during acidizing treatments during the production of oil, gas, and/or water wells.

SUMMARY

In general, the present disclosure is directed to a corrosion inhibitor composition comprising a nitrogen containing heteroaromatic compound and a haloalkynyl carbamate compound.

In another embodiment, the present disclosure is directed to a method of inhibiting corrosion on a surface wherein the method comprises contacting the surface with a corrosion inhibitor composition comprising a nitrogen containing heteroaromatic compound and a haloalkynyl carbamate compound.

Other features and aspects of the present disclosure are discussed in greater detail below.

DETAILED DESCRIPTION

Definitions

It is to be understood that the terminology used herein is for the purpose of describing particular embodiments only and is not intended to limit the scope of the present invention.

"Alkyl" refers to monovalent saturated aliphatic hydrocarbyl groups having from 1 to 25 carbon atoms or from 10 to 25 carbon atoms, such as from 1 to 20 carbon atoms, such as from 1 to 10 carbon atoms, such as from 1 to 5 carbon atoms. "$C_{x-y}$ alkyl" refers to alkyl groups having from x to y carbon atoms wherein x and y may be any number from 1 to 25. This term includes, by way of example, linear and branched hydrocarbyl groups such as methyl, ethyl, n-propyl, isopropyl, n-butyl, isobutyl, sec-butyl, t-butyl, n-pentyl, neopentyl, and so forth.

"Alkenyl" refers to a linear or branched hydrocarbyl group having from 2 to 25 carbon atoms, such as from 2 to 20 carbon atoms, such as from 2 to 10 carbon atoms, such as from 2 to 5 carbon atoms and having at least 1 site of vinyl unsaturation ($>C=C<$). "$C_{x-y}$ alkenyl" refers to alkenyl groups having from x to y carbon atoms wherein x and y may be any number from 2 to 25. This term includes, by way of example, example, ethenyl, propenyl, 1,3-butadienyl, and so forth.

"Alkynyl" refers to a linear or branched hydrocarbyl group having from 2 to 25 carbon atoms, such as from 2 to 20 carbon atoms, such as from 2 to 10 carbon atoms, such as from 2 to 5 carbon atoms and having at least one carbon-carbon triple bond ($-C\equiv C-$). "$C_{x-y}$" alkynyl refers to alkynyl groups having from x to y carbon atoms wherein x and y may be any number from 2 to 25. This term includes, by way of example, ethynyl, propynyl, 2-butynyl, 3-butynyl, and so forth.

"Alkylene" refers to a divalent group derived form a linear or branched hydrocarbyl group by the removal of two hydrogen atoms and may have from 1 to 25 carbon atoms, such as from 1 to 20 carbon atoms, such as from 1 to 10 carbon atoms, such as from 1 to 5 carbon atoms. "$C_{x-y}$ alkylene" refers to alkylene groups having from x to y carbon atoms wherein x and y may be any number from 1 to 25. This term includes, by way of example, methylene, ethylene, propylene, butylene, and so forth.

"Aryl" refers to an aromatic group of from 3 to 14 carbon atoms and no ring heteroatoms and having a single ring (e.g., phenyl) or multiple condensed (fused) rings (e.g., naphthyl or anthryl). For multiple ring systems, including fused, bridged, and spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Alkoxy" refers to an alkyl attached to a parent molecule through an oxygen atom. This term includes, by way of example, methoxy, ethoxy, propoxy, and so forth.

"Amino" refers to a group having the structure —NR'R" wherein R' and R" are independently selected from H and alkyl. R' and R" taken together may optionally be —$(CH_2)_k$— where k is an integer of from 2 to 6. This term includes, by way of example, amino (—$NH_2$), methylamino, ethylamino, n-propylamino, iso-propylamino, dimethylamino, methylethylamino, piperidine, pyrrolidine, and so forth.

"Aminoalkyl" refers to an alkyl group substituted by one or more amino groups. This term includes, by way of example, aminomethyl, dimethylaminomethyl, diethylaminomethyl, 2-aminoethyl, 2-dimethylaminoethyl, and so forth.

"Arylalkyl" refers to an aryl group in which an alkyl group is substituted for at least one of the aryl hydrogen atoms and the aryl group is attached to the parent molecule through an alkylene group. This term includes, by way of example, benzyl, phenylethyl, phenylpropyl, naphta-1-ylmethyl, and so forth.

"Alkaryl" refers to an alkyl group in which an aryl group is substituted for at least one of the alkyl hydrogen atoms and the alkyl group is attached to the parent molecule through an arylene group.

"Aryloxy" refers to an aryl group in which an oxygen is substituted for at least one of the aryl hydrogen atoms and the aryl group is attached to the parent molecule through the oxygen atom.

"Cycloalkyl" refers to a saturated carbocyclic ring having from 3 to 10 carbon atoms. The cycloalkyl may optionally contain an additional N, O, or S ring atom. This term includes, by way of example, cyclopropyl, cyclobutyl, cyclopentyl, cyclohexyl, piperidyl, pyrroidinyl, piperazinyl, morpholinyl, and so forth.

"Halide" refers to an iodide, bromide, chloride, or fluoride.

"Heteroaryl" refers to an aromatic group of from 3 to 14 carbon atoms and 1 to 6 heteroatoms selected from oxygen, nitrogen, and sulfur and includes single ring (e.g. imidazolyl) and multiple ring systems (e.g. benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g. 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O), sulfinyl, or sulfonyl moieties. This term includes, by way of example, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heteroarylalkyl" refers to a heteroaryl group in which an alkyl group is substituted for at least one of the heteroaryl hydrogen atoms and the heteroaryl group is attached to the parent molecule through an alkylene group.

"Alkylheteroaryl" refers to an alkyl group in which a heteroaryl group is substituted for at least one of the alkyl hydrogen atoms and the alkyl group is attached to the parent molecule through a heteroarylene group.

"Heteroaryl oxy" refers to a heteroaryl group in which an oxygen is substituted for at least one of the heteroaryl hydrogen atoms and the heteroaryl group is attached to the parent molecule through the oxygen atom.

"Heterocyclic" or "heterocycle" or "heterocycloalkyl" or "heterocyclyl" refers to a saturated or partially saturated cyclic group having from 3 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g. decahydroquinolin-6-yl). In some embodiments, the nitrogen and/or sulfur atom(s) of the heterocyclic group are optionally oxidized to provide for the N oxide, sulfinyl, sulfonyl moieties. This term includes, by way of example, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

"Hydroxyalkyl" refers to an alkyl group substituted with one or more hydroxyl groups wherein the hydroxyl group is attached to a parent molecule through the alkyl group. The term includes, by way of example, hydroxymethyl, 2-hydroxyethyl, 2-hydroxypropyl, and so forth.

It should be understood that the aforementioned definitions encompass unsubstituted groups, as well as groups substituted with one or more other functional groups as is known in the art. For example, an aryl, heteroaryl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, am idino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester)amino, (carboxyl ester)oxy, cyano, cycloalkyl, cycloalkyloxy, cycloalkylthio, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

Description

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations.

Generally speaking, the present disclosure is directed to a corrosion inhibitor composition and a method of inhibiting corrosion on a surface. In particular, the corrosion inhibitor composition disclosed herein can reduce the amount of corrosion that occurs on a surface, such as a metal surface. For instance, such reduction can be observed when employing an acidizing treatment with the corrosion inhibitor composition for the stimulation of a well when compared to an acidizing treatment without the corrosion inhibitor composition.

The corrosion inhibitor composition comprises at least one nitrogen containing heteroaromatic compound and at least one haloalkynyl carbamate compound. The present inventors have discovered that employing a combination of the aforementioned components does not only serve as an effective corrosion inhibitor but also exhibits synergistic behavior. For instance, a corrosion inhibitor composition employing the combination of at least one nitrogen containing heteroaromatic compound and at least one haloalkynyl carbamate compound unexpectedly reduces the corrosion rate of a surface, such as a metal surface, in comparison to the corrosion rate when employing either component individually.

The nitrogen containing heteroaromatic compound as defined herein is an aromatic compound having at last one ring carbon substituted for a nitrogen atom. The nitrogen containing heteroaromatic compounds may have from 5 to 14 ring atoms, such as from 5 to 10 ring atoms, such as from 5 to 7 ring atoms. In one embodiment, the nitrogen containing heteroaromatic compound may have 6 ring atoms. Additionally, the compound may optionally contain O, S, and/or additional N ring atoms.

The nitrogen containing heteroaromatic compound may be unquaternized (e.g., neutral) or may be quaternized (e.g., positively charged nitrogen for example when a tertiary amine is converted to a quaternary ammonium). Alternatively, the at least one nitrogen containing heteroaromatic compound may include a combination of unquaternized and quaternized compounds.

In one embodiment, the nitrogen containing heteroaromatic compound may be present in an unquaternized state having the structure as indicated by Formula I:

Formula I

In one embodiment, the nitrogen containing heteroaromatic compound may be present in a quaternized state having the structure as indicated by Formula II:

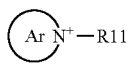

Formula II wherein

R11 is an alkyl group, an alkenyl group, an alkynyl group, an aryl group, an arylalkyl group, an alkaryl group, an aryloxy group, a heteroaryl group, a heteroarylalkyl group, an alkylheteroaryl group, a heteroaryloxy group, a cycloalkyl group, an amino group, an aminoalkyl group, an alkoxy group, a hydroxyalkyl group, or a cyano group. As disclosed herein, such R11 group may be referred to as a substituent group on the nitrogen of the heteroaromatic compound.

In one embodiment, R11 may be an alkyl group, an alkenyl group, an aryl group, an arylalkyl group, an alkaryl group, a heteroaryl group, a heteroarylalkyl group, or an alkylheteroaryl group. In one particular embodiment, R11 is an arylalkyl group, an alkaryl group, a heteroarylalkyl group, or an alkylheteroaryl group. In such embodiment, the aryl groups may contain from 5 to 9 carbon atoms, such as from 5 to 7 carbon atoms, such as 6 carbon atoms and the heteroaryl group may contain from 5 to 9 carbon atoms with 1 to 2 heteroatoms, such as from 5 to 7 carbon atoms with 1 to 2 heteroatoms. In such embodiment, the alkylene group may be a $C_{1-10}$ alkylene group, such as a $C_{1-5}$ alkylene group, such as a $C_{1-3}$ alkylene group, such as a methylene group.

In another embodiment, the R11 substituent group may be a $C_{1-20}$ alkyl group, a $C_{2-20}$ alkenyl group, a $C_{2-20}$ alkynyl group, an aryl group comprising from 5 to 9 carbon atoms, an arylalkyl group comprising an aryl group comprising from 5 to 9 carbon atoms and a $C_{1-20}$ alkyl group, an alkaryl group comprising an aryl group comprising from 5 to 9 carbon atoms and a $C_{1-20}$ alkyl group, a heteroaryl group comprising an aryl group comprising from 5 to 9 carbon atoms and a $C_{1-20}$ alkyl group, a heteroarylalkyl group comprising an aryl group comprising from 5 to 9 carbon atoms and a $C_{1-20}$ alkyl group, an alkylheteroaryl group comprising an aryl group comprising from 5 to 9 carbon atoms and a $C_{1-20}$ alkyl group, a cycloalkyl group comprising from 5 to 9 carbon atoms, or a hydroxyalkyl group comprising a $C_{1-20}$ alkyl group. The aforementioned alkyl group may be and a $C_{1-10}$ alkyl group such as a $C_{1-5}$ alkyl groups.

The quaternized version of the nitrogen containing heteroaromatic compound may also have a counteranion selected from the group consisting of a carbonate, a bicarbonate, a halide, a phosphate, an ethosulfate, a citrate, a borate, a nitrate, a $C_{1-20}$ carboxylate, and mixtures thereof. In one embodiment, the counteranion is a halide such as a chloride, a bromide, a fluoride, or an iodide. In one particular embodiment, the counterion is a chloride.

Additionally, the carbon atoms of the compounds of Formulae I and II may be substituted with one or more alkyl groups, alkenyl groups, alkynyl groups, aryl groups, arylalkyl groups, alkaryl groups, heteroaryl groups, heteroarylalkyl groups, alkylheteroaryl groups, cycloalkyl groups, amino groups, aminoalkyl groups, alkoxy groups, hydroxyalkyl groups, cyano groups, or a mixture thereof.

In another embodiment, the carbon atoms of the compounds of Formulae I and II may be substituted with a $C_{1-20}$ alkyl group, a $C_{2-20}$ alkenyl group, a $C_{2-20}$ alkynyl group, an aryl group comprising from 5 to 9 carbon atoms, an arylalkyl group comprising an aryl group comprising from 5 to 9 carbon atoms and a $C_{1-20}$ alkyl group, an alkaryl group comprising an aryl group comprising from 5 to 9 carbon atoms and a $C_{1-20}$ alkyl group, a heteroaryl group comprising an aryl group comprising from 5 to 9 carbon atoms and a $C_{1-20}$ alkyl group, a heteroarylalkyl group comprising an aryl group comprising from 5 to 9 carbon atoms and a $C_{1-20}$ alkyl group, an alkylheteroaryl group comprising an aryl group comprising from 5 to 9 carbon atoms and a $C_{1-20}$ alkyl group, a cycloalkyl group comprising from 5 to 9 carbon atoms, or a hydroxyalkyl group comprising a $C_{1-20}$ alkyl group. The aforementioned alkyl groups may be $C_{1-10}$ alkyl groups such as a $C_{1-5}$ alkyl groups.

In one embodiment, the carbon atoms of the compounds of Formulae I and II may be substituted with one or more alkyl groups, such as a $C_{1-20}$ alkyl group, such as a $C_{1-10}$ alkyl group, such as a $C_{1-5}$ alkyl group. In one embodiment, a mixture of nitrogen containing heteroaromatic compounds having different carbon substituent groups as defined above, such as different alkyl groups such as $C_{1-10}$ alkyl groups, may be employed.

In one embodiment, the nitrogen containing heteroaromatic compound may be fused with one or more aromatic compounds having from 3 to 14 ring atoms or one or more cyclic compounds having from 3 to 14 ring atoms wherein the ring compounds may optionally contain an O, a S, or an additional N ring atom.

The nitrogen containing heteroaromatic ring compound may be an azete, a pyrrole, an imidazole, an imidazoline, a pyrazole, a triazole, a tetrazole, a pyridine, a pyrazine, a pyrimidine, a nicotinic acid including arecoline, nicotinamide, nicorandil, nikethamide, and nimodipine, a pyrindine, a pyridazine, an oxazine, a thiazine, a triazine, an azepine, a diazepine, an indole including an isoindole, a quinoline including an isoquinoline and a benzoquinoline, a benzazepine, a carbazole, an acridine, a cinnoline, or a quinazoline. As previously mentioned, these ring compounds may be substituted or unsubstituted, fused with one or more aromatic compounds or cyclic compounds, or present in a quaternized or unquaternized state. The aforementioned names may be used interchangeably when referring to a compound in a quaternized or unquaternized state. Accordingly, these compounds may be optionally quaternized.

When in a quaternized state, by way of example, the nitrogen containing heteroaromatic ring compounds may be pyrrolium, imidazolium, pyrazolium, triazolium, tetrazolium, pyridinium, pyrazinium, pyrimidinium, pyradazinium, oxazinium, thiazinium, triazinium, azepinium, indolium including an isoindolium, quinolium including an isoquinolium and a benzoquinolium, carbazolium, acridinium, cinnolinium, or a quinazolininium. Similarly, as previously mentioned, these ring compounds may be substituted or unsubstituted or fused with one or more aromatic compounds or cyclic compounds.

In one embodiment, the nitrogen containing heteroaromatic compound is a quinoline or a pyridine either quaternized and/or unquaternized. In one particular embodiment, the nitrogen containing heteroaromatic compound is a pyridine either quaternized and/or unquaternized. In one embodiment, the nitrogen containing heteroaromatic compound is a quaternized pyridine, such as a pyridinium.

In one embodiment, the nitrogen containing heteroaromatic compound is a substituted pyridine. The pyridine may be unquaternized (e.g., neutral) or quaternized (e.g., pyridinium). In one embodiment, the substituted groups may be any of the aforementioned groups. In another embodiment, the substituted groups may be a $C_{1-20}$ alkyl or a $C_{2-20}$ alkenyl group to provide an alkyl pyridine (or pyridinium) or an alkenyl pyridine (or pyridinium). The aforementioned group may be $C_{1-10}$ or $C_{1-5}$ alkyl groups or $C_{2-10}$ or $C_{2-5}$ alkenyl groups.

The quaternary amine compounds comprise aromatic nitrogen compounds including alkyl pyridine-N-methyl chloride quaternary, alkyl pyridine-N-benzyl chloride quaternary, quinoline-N-methyl chloride quaternary, quinoline-N-benzyl chloride quaternary, quinoline-N-(chloro-benzyl chloride) quaternary, isoquinoline quaternaries, benzoquinoline quaternaries, chloromethyl naphthalene quaternaries and mixtures of such compounds, and the like.

The pyridine compounds may include, but are not limited to, -methylpyridine, 2-methylpyridine, 3-methylpyridine, 2,4-dimethyl pyridine, 3,5-dimethyl pyridine, 2,5-dimethyl pyridine, 2,4,6-trimethylpyridine, 2-methyl-3,5-diethylpyridine, 3-ethyl-4-methylpyridine, 2-methyl-5-(but-2-enyl) pyridine, 2-(prop-1-enyl)-5-ethylpyridine, 2-vinylpyridine, 4-vinylpyridine, 2-methyl, 5-vinyl pyridine, 3-pyridiylcarbinol, 3-methylpyridine, 3,5-diethyl-1,2-dihydro-1-phenyl-2-propylpyridine, 2,6-dimethylpyridine, 3-cyanopyridine, 2-cyanopyridine, 2,3,5-trimethylpyridine, 2,4,6-trimethylpyridine, 2-amino-3-methylpyridine, 2-aminopyridine, 2-methyl-5-(2-ethylaminoethyl)pyridine, 5H-1-pyridine-6, 7-dihydro, and combinations thereof. While the compounds may indicate an unquaternized state, it should be understood that these compounds may also be present in a quaternized state. When in a quaternized state, a counteranion such as a halide (e.g., chloride) may also be present.

For instance, a quaternary pyridinium compound may include, but is not limited to, N-alkyl, N-cycloalkyl and N-alkylaryl pyridinium halides such as N-cyclohexylpyridinium bromide, N-octylpyridinium bromide, N-nonylpyridinium bromide, N-decylpyridinium bromide, N-dodecylpyridinium bromide, N,N-didodecyldipyridinium dibromide, N-tetradecylpyridinium bromide, N-laurylpyridinium chloride, N-dodecylbenzylpyridinium chloride, N-dodecylquinolinium bromide, N-(1-methylnapthyl)quinolinium chloride, N-benzylquinolinium chloride and the like. While the compounds may indicate a quaternized state, it should be understood that these compounds may also be present in an unquaternized state. Additionally, the pyridinium compounds may be substituted or unsubstituted as defined above.

In one embodiment, the nitrogen containing heteroaromatic compound may be a substituted quinoline. The quinoline may be unquaternized (e.g., neutral) or quaternized (e.g., quinolinium). In one embodiment, the substituted groups may be any of the aforementioned groups. In another embodiment, the substituted groups may be a $C_{1-20}$ alkyl or a $C_{2-20}$ alkenyl group to provide an alkyl quinoline (or quinolinium) or an alkenyl quinoline (or quinolinium). The aforementioned group may be $C_{1-10}$ or $C_{1-5}$ alkyl groups or $C_{2-10}$ or $C_{2-5}$ alkenyl groups.

The quinoline compounds may include, but are not limited to, 2,4-dimethylquinoline, 2,6-dimethylquinoline, 2,7-dimethylquinoline, 4-methoxy-2-phenylquinoline, 2-(3,4-methylenedioxyphenylethyl)quinoline, 2-n-propylquinoline, 2-(prop-1-enyl)quinoline, 4-methoxy-2-n-pentylquinoline, cusparine, skimmianine, chinanine, 4-aminoquinoline, 4-methyl-2-phenylquinoline, and the like. While the compounds may indicate an unquaternized state, it should be understood that these compounds may also be present in a quaternized state. When in a quaternized state, a counteranion such as a halide (e.g., chloride) may also be present.

As indicated, the corrosion inhibitor composition includes at least one nitrogen containing heteroaromatic compound. As used herein, the at least one nitrogen containing heteroaromatic compound may be a mixture of nitrogen containing heteroaromatic compounds as defined above. For instance, it should be understood that the nitrogen containing heteroaromatic compounds mentioned above may be used individually or in combination as a mixture.

In addition to the at least one nitrogen containing heteroaromatic compound, the corrosion inhibitor composition comprises at least one haloalkynyl carbamate compound. As demonstrated in the examples, the combination of the at least one nitrogen containing heteroaromatic compound and the at least haloalkynyl carbamate compound exhibits synergistic behavior when employed for the inhibition of corrosion on a surface, such as a metal surface.

As is generally known in the art, the haloalkynyl carbamate compound comprises at least a carbamate, a halo or halide group, and an alkynyl group such as a $C_{2-20}$ alkynyl group, such as a $C_{2-10}$ alkynyl group, such as a $C_{2-5}$.

In one embodiment, while not limited to such structure, the haloalkynyl carbamate compound may have the structure as indicated by Formula III:

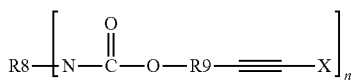

Formula III wherein

R8 is a hydrogen, an alkyl group, an alkenyl group, an alkynyl group, an aryl group, an arylalkyl group, an alkaryl group, a heteroaryl group, heteroarylalkyl group, an alkylheteroaryl group, a cycloalkyl group, an aminoalkyl group, a hydroxyalkyl group;

R9 is an alkylene group,

X is a halide; and n is from 1 to 3.

In another embodiment, the R8 may be a $C_{1-20}$ alkyl group, a $C_{2-20}$ alkenyl group, a $C_{2-20}$ alkynyl group, an aryl group comprising from 5 to 9 carbon atoms, an arylalkyl group comprising an aryl group comprising from 5 to 9 carbon atoms and a $C_{1-20}$ alkyl group, an alkaryl group comprising an aryl group comprising from 5 to 9 carbon atoms and a $C_{1-20}$ alkyl group, a heteroaryl group comprising an aryl group comprising from 5 to 9 carbon atoms and a $C_{1-20}$ alkyl group, a heteroarylalkyl group comprising an aryl group comprising from 5 to 9 carbon atoms and a $C_{1-20}$ alkyl group, an alkylheteroaryl group comprising an aryl group comprising from 5 to 9 carbon atoms and a $C_{1-20}$ alkyl group, a cycloalkyl group comprising from 5 to 9 carbon atoms, an aminoalkyl group comprising a $C_{1-20}$ alkyl group, or a hydroxyalkyl group comprising a $C_{1-20}$ alkyl group. The aforementioned alkyl groups may be $C_{1-10}$ alkyl groups such as a $C_{1-5}$ alkyl groups.

In another embodiment, R8 may be a $C_{1-20}$ alkyl group, such as a $C_{1-10}$ alkyl group, such as a $C_{1-5}$ alkyl group, or a $C_{2-20}$ alkenyl group, such as a $C_{2-10}$ alkenyl group, such as a $C_{2-5}$ alkenyl group. R8 substituents may include alkyls such as methyl, ethyl, propyl, n-butyl, t-butyl, pentyl, hexyl, heptyl, octyl, nonyl, decyl, dodecyl, octadecyl, cycloalkyls such as cyclopropargyl, cyclohexyl, aryls, aralalkyls and alkaryls such as phenyl, benzyl, tolyl, cumyl, halogenated alkyls and aryls, such as chlorobutyl and chlorophenyl, and alkoxy aryls such as ethoxyphenyl and the like.

In one embodiment, R9 is a $C_{1-10}$ alkylene group, such as a $C_{1-5}$ alkylene group, such as a $C_{1-3}$ alkylene group. In one particular embodiment, R9 is a methylene group.

In one embodiment, X is a halide such as a bromide, a chloride, a fluoride, or an iodide. In one particular embodiment, X is an iodide.

In one embodiment, R8 is a $C_4$ alkyl group (e.g., butyl group), R9 is a $C_1$ alkylene group (e.g., —$CH_2$— methylene group), and X is an iodide. In such embodiment, the haloalkynyl carbamate compound may be a 3-iodo-2-propynyl butyl carbamate having the structure as indicated by Formula IV:

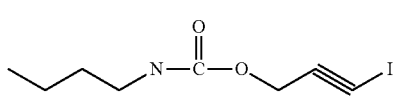

Formula IV

While Formula IV is provided above, it should be understood that any haloalkynyl carbamate compound known in the art may be employed in the present composition. For instance, the haloalkynyl carbamate compound may include 3-iodo-2-propynyl propyl carbamate, 3-iodo-2-propynyl butyl carbamate, 3-iodo-2-propynyl hexyl carbamate, 3-iodo-2-propynyl cyclohexyl carbamate, 3-iodo-2-propynyl phenyl carbamate, 3-iodo-2-propynylbenzyl carbamate, 4-iodo-3-butynyl propyl carbamate, and mixtures thereof.

As indicated, the corrosion inhibitor composition includes at least one haloalkynyl carbamate compound. As used herein, the at least one haloalkynyl carbamate compound may be a mixture of haloalkynyl carbamate compounds as defined above. For instance, it should be understood that the haloalkynyl carbamate compounds mentioned above may be used individually or in combination as a mixture.

The nitrogen containing heteroaromatic compound(s) and the haloalkynyl carbamate compound(s) may be present in a weight ratio of about 1:100 or more, such as about 1:50 or more, such as about 1:25 or more, such as about 1:10 or more, such as about 1:5 or more, such as about 1:2 or more, such as about 1:1 or more to about 100:1 or less, such as about 50:1 or less, such as about 25:1 or less, such as about 10:1 or less, such as about 5:1 or less, such as about 3:1 or less. In one embodiment, the at least one nitrogen containing heteroaromatic compound(s) may be present in an amount by weight greater than the at least one haloalkynyl carbamate compound(s).

In one embodiment, the composition may be provided with a solvent or another component and/or may be relatively concentrated. In another embodiment, the composition may be utilized with an acidic solution, such as an acidic aqueous solution as defined below. Accordingly, the total active concentration may differ when comparing a concentrated composition and a diluted composition. When concentrated or in the composition, the total active concentration may be about 5 wt. % or more, such as about 10 wt. % or more, such as about 30 wt. % or more, such as about 50 wt. % or more to about 100 wt. % or less, such as about 75 wt. % or less, such as about 50 wt. % or less, such as about 25 wt. % or less. When formulated in a concentrated state, the composition may later be diluted with an organic solvent, water, or a combination thereof. Thus, when employed with an acidic solution, such as an aqueous acidic solution, the total active concentration may be about 0.01 wt. % or more, such as about 0.1 wt. % or more, such as about 0.2 wt. % or more, such as about 0.5 wt. % or more to about 20 wt. % or less, such as about 10 wt. % or less, such as about 5 wt. % or less, such as about 2.5 wt. % or less.

As used herein, the total active concentration is the total amount of the nitrogen containing heteroaromatic compound(s) and the haloalkynyl carbamate compound(s). However, it should be understood that the amount of the total active concentration varies depending on the system in which the ingredients are used. Methods for monitoring corrosion are well known in the art thereby allowing one to adjust the concentration of active ingredients employed.

In one embodiment, the corrosion inhibitor composition may also contain an iodide salt intensifier selected from the group consisting of lithium iodide, sodium iodide, potassium iodide, calcium iodide, magnesium iodide, ammonium iodide, tetraethylammonium iodide, tetrapropylammonium iodide, tetrabutylammonium iodide, tetrapentylammonium iodide, tetrahexylammonium iodide, tetraheptylammonium iodide, tetraphenylammonium iodide, and phenytrimethylammonium iodide. The aforementioned iodide salt intensifier may be present in an amount of from about 0.01 wt. % to about 10 wt. %. In another embodiment, the composition may be substantially free of the aforementioned iodide salt intensifiers such that they are present in an amount of less than about 0.1 wt. %, such as less than about 0.05 wt. %, such as less than about 0.01 wt. %, such as about 0 wt. %.

In one embodiment, the corrosion inhibitor composition may include an alkynol. As is generally known in the art, an alkynol refers to an alcohol containing an alkyne or alkynyl group. Without intending to be limited by theory, the alkynol may allow the corrosion inhibition composition to be effective at more extreme conditions, such as higher temperatures.

In one embodiment, the alkynol may have a structure, although it is not limited to such structure, as indicated by Formula V:

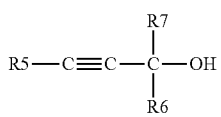

Formula V wherein

R5, R6, and R7 are individually hydrogen, an alkyl group, an alkenyl group, an alkynyl group, an aryl group, an arylalkyl group, an alkaryl group, an aryloxy group, a heteroaryl group, a heteroarylalkyl group, an alkylheteroaryl group, a heteroaryloxy group, a cycloalkyl group, an amino group, an aminoalkyl group, an alkoxy group, or a hydroxyalkyl group. These groups may be substituted or unsubstituted as defined above.

In another embodiment, R5, R6, and R7 are individually hydrogen, a $C_{1-20}$ alkyl group, a $C_{2-20}$ alkenyl group, a $C_{2-20}$ alkynyl group, an aryl group comprising from 5 to 9 carbon atoms, an arylalkyl group comprising an aryl group comprising from 5 to 9 carbon atoms and a $C_{1-20}$ alkyl group, an alkaryl group comprising an aryl group comprising from 5 to 9 carbon atoms and a $C_{1-20}$ alkyl group, an aryloxy group comprising an aryl group comprising from 5 to 9 carbon atoms, a heteroaryl group comprising an aryl group comprising from 5 to 9 carbon atoms and a $C_{1-20}$ alkyl group, a heteroarylalkyl group comprising an aryl group comprising from 5 to 9 carbon atoms and a $C_{1-20}$ alkyl group, an alkylheteroaryl group comprising an aryl group comprising from 5 to 9 carbon atoms and a $C_{1-20}$ alkyl group, a cycloalkyl group comprising from 5 to 9 carbon atoms, an amino group, an aminoalkyl group comprising a $C_{1-20}$ alkyl group, an alkoxy group comprising a $C_{1-20}$ alkyl group, or a hydroxyalkyl group comprising a $C_{1-20}$ alkyl group. The aforementioned alkyl groups may be $C_{1-10}$ alkyl groups such as a $C_{1-5}$ alkyl groups.

In one particular embodiment, the alkynol may have a structure as indicated by Formula VI wherein the R5 of Formula V is a hydroxyalkyl group:

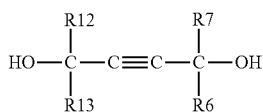

Formula VI wherein

R6, R7, R12, and R13 are individually hydrogen, an alkyl group, an alkenyl group, an alkynyl group, an aryl group, an arylalkyl group, an alkaryl group, an aryloxy group, a heteroaryl group, a heteroarylalkyl group, an alkylheteroaryl group, a heteroaryloxy group, a cycloalkyl group, an amino group, an aminoalkyl group, an alkoxy group, or a hydroxyalkyl group. These groups may be substituted or unsubstituted as defined above.

In another embodiment, R6, R7, R12, and R13 are individually hydrogen, a $C_{1-20}$ alkyl group, a $C_{2-20}$ alkenyl group, a $C_{2-20}$ alkynyl group, an aryl group comprising from 5 to 9 carbon atoms, an arylalkyl group comprising an aryl group comprising from 5 to 9 carbon atoms and a $C_{1-20}$ alkyl group, an alkaryl group comprising an aryl group comprising from 5 to 9 carbon atoms and a $C_{1-20}$ alkyl group, an aryloxy group comprising an aryl group comprising from 5 to 9 carbon atoms, a heteroaryl group comprising an aryl group comprising from 5 to 9 carbon atoms and a $C_{1-20}$ alkyl group, a heteroarylalkyl group comprising an aryl group comprising from 5 to 9 carbon atoms and a $C_{1-20}$ alkyl group, an alkylheteroaryl group comprising an aryl group comprising from 5 to 9 carbon atoms and a $C_{1-20}$ alkyl group, a cycloalkyl group comprising from 5 to 9 carbon atoms, an amino group, an aminoalkyl group comprising a $C_{1-20}$ alkyl group, an alkoxy group comprising a $C_{1-20}$ alkyl group, or a hydroxyalkyl group comprising a $C_{1-20}$ alkyl group. The aforementioned alkyl groups may be $C_{1-10}$ alkyl groups such as a $C_{1-5}$ alkyl groups.

In Formulae V and VI, the alkyl group, whether alone or as a part of another group (e.g., arylalkyl, alkaryl, aminoalkyl, hydroxyalkyl, etc.) may be a $C_{1-15}$ alkyl group, such as a $C_{1-10}$ alkyl group, such as a $C_{1-5}$ alkyl group, such as a $C_{1-3}$ alkyl group.

In one embodiment, R5, R6, and R7 may all be hydrogen. In another embodiment, R6, R7, R12, and R13 may be an alkyl group, such as a $C_{1-3}$ alkyl group, such as a methyl group. In one embodiment, they may be a combination of hydrogen and an alkyl group, such as a $C_{1-3}$ alkyl group, such as a methyl group.

The alkynol may include, but is not limited to, a butynol including methyl butynol, 2-butynol, 3-butyn-2-ol, benzyl butynol, and naphthyl butynol, methyl pentynol, 3-pentyn-2-ol, hexynol, 2-hexyn-1-ol, 2-heptyn-1-ol, ethyl octynol, 4,4-dimethyl-2-pentyn-1-ol, propargly alcohol, ethyl cyclohexanol, 4,4-dimethyl-2-pentyn-1-ol, 1-methoxy-4-methyl-2-butyn-4-ol, 3-pentyn-2-ol, 1-hydroxy-4-methyl-pent-2-yn-4-yl, butynediol, dimethylbutynediol, 3-hexyne-2,5-diol, 2,5-dimethyl-3-hexyne-2,5-diol, 3,6-dimethyloct-4-yne-3,6-diol, 2,2,3,6,7,7-hexamethyl-4-octyne-3,-diol, and the like, and mixtures thereof.

In one embodiment, the alkynol includes 2,5-dimethyl-3-hexyne-2,5-diol. In one embodiment, the alkynol includes a butynol such as a 3-butyn-2-ol.

However, it should be understood that the alkynol is not limited to those mentioned above and that any alkynol containing an alcohol and an alkyne or alkynyl group may be employed. In addition, a combination of alkynols may be employed in the composition.

When provided as a concentrate or in the composition, the alkynol may be present in the composition in an amount of about 5 wt. % or more, such as about 10 wt. % or more, such as about 20 wt. % or more, such as about 40 wt. % or more to about 80 wt. % or less, such as about 70 wt. % or less, such as about 50 wt. % or less, such as about 25 wt. % or less. When employed with an aqueous acidic solution, the alkynol may be present in an amount of about 0.01 wt. % or more, such as about 0.1 wt. % or more, such as about 0.2 wt. % or more, such as about 0.5 wt. % or more to about 20 wt. % or less, such as about 10 wt. % or less, such as about 5 wt. % or less, such as about 2.5 wt. % or less.

In one embodiment, the corrosion inhibitor composition may include a base. In one embodiment, the base may be a weak base. In one embodiment, the base may be a hydroxyalkylamine wherein the alkyl group is a $C_{1-5}$ alkyl group. In one embodiment, the hydroxyalkylamine may be a monoalknolamine, a dialkanolamine, a trialkanolamine, or a combination thereof. For instance, the hydroxyalkylamine may be monoethanolamine, monopropanolamine, monoisopropanolamine, diethanolamine, dipropanolamine, triethanolamine, tripropanolamine, and the like, and mixtures thereof. The base may also include morpholines, anilines, ammonias, dimethylamine, ethylamine, glycine, methylamine, trimethylamine, hydrazine, and the like, and mixtures thereof.

However, it should be understood that the base is not limited to those mentioned above and that any base may be employed. In addition, a combination of bases may be employed in the composition.

When provided as a concentrate or in the composition, the base may be present in the composition in an amount of about 2 wt. % or more, such as about 5 wt. % or more, such as about 10 wt. % or more, such as about 20 wt. % or more, such as about 40 wt. % or more to about 80 wt. % or less, such as about 70 wt. % or less, such as about 50 wt. % or less, such as about 25 wt. % or less. When employed with an aqueous acidic solution, the base may be present in an amount of about 0.01 wt. % or more, such as about 0.1 wt. % or more, such as about 0.2 wt. % or more, such as about 0.5 wt. % or more to about 20 wt. % or less, such as about 10 wt. % or less, such as about 5 wt. % or less, such as about 2.5 wt. % or less.

In one embodiment, the corrosion inhibitor composition may include a biocide. In general, biocides may include pesticides (e.g., fungicides, algicides, molluscicides, etc.) and antimicrobials (e.g., germicides, antifungals, antibacterials, etc.). The biocide may be, but is not limited to, an oxidizing or non-oxidizing biocide. The biocide may include thiabendazole, propiconazole, tebuconazole, metronidazole, an isothiazolone, a pyrithione, aldehydes such as formaldehyde, glutaraldehyde, dimethylol dimethyl hydantoin, bis-(tetrakishydroxymethyl phosphonium) sulfate or chloride, 2,2-dibromo-3-nitriloproprionamide, 2-bromo-2-nitropropane-1,3-diol, N-benzyl alklyl dimethyl quaternary ammonium salts, dialkyl dimethyl quaternary ammonium salts, polyhexamethylene biguanide, cocodiamine, N-3-aminopropyl-N-dodecyl-1,3-propanediamine, sodium hypochlorite, trichloroisocyanuric acid, dichloroisocyanuric acid, calcium hypochlorite, lithium hypochlorite, chlorinated hydantoins, stabilized sodium hypobromite, activated sodium bromide, brominated hydantoins, chlorine dioxide, ozone, peracids, peroxides, and the like, and mixtures thereof.

However, it should be understood that the biocide is not limited to those mentioned above and that any biocide may be employed. In addition, a combination of bases may be employed in the composition.

When provided as a concentrate or in the composition, the biocide may be present in the composition in an amount of about 2 wt. % or more, such as about 5 wt. % or more, such as about 10 wt. % or more, such as about 20 wt. % or more, such as about 40 wt. % or more to about 80 wt. % or less, such as about 70 wt. % or less, such as about 50 wt. % or less, such as about 25 wt. % or less. When employed with an aqueous acidic solution, the biocide may be present in an amount of about 0.01 wt. % or more, such as about 0.1 wt. % or more, such as about 0.2 wt. % or more, such as about 0.5 wt. % or more to about 20 wt. % or less, such as about 10 wt. % or less, such as about 5 wt. % or less, such as about 2.5 wt. % or less.

In one embodiment, the corrosion inhibitor composition may include a surfactant. In general, the surfactant may aid to disperse the corrosion inhibitor components in the acidic solution as well as to help wet the equipment employed during acidizing treatments. The surfactant may be an anionic surfactant, a cationic surfactant, a nonionic surfactant, an amphoteric (zwitterionic) surfactant, or a combination thereof. In one particular embodiment, the surfactant may be a nonionic surfactant. In another particular embodiment, the surfactant may be an amphoteric surfactant.

The anionic surfactants may include, but are not limited to, alkyl sulfates, sulfonates such as alkyl, aryl, olefin, and paraffin sulfonates, alkyl sulfates, alcohol and alcohol ether sulfates, alkyl and alkyl ether carboxylates, fatty carboxylates, alkyl and ethoxylated alkyl phosphate esters, mono and dialkyl sulfosuccinates, taurates, phosphates such as alkyl phosphates, alkyl benzene sulfonates and the like, and mixtures thereof. When employing an alkyl chain, the alkyl chain length on the surfactant may range from 6 to 24 carbon atoms.

The cationic surfactants may include, but are not limited to, monoalkyl quaternary amines, such as cocotrimethylammonium chloride, cetyltrimethylammonium chloride, stearyltrimethylammonium chloride, soyatrimethylammonium chloride, and behentrimethylammonium chloride, and the like and mixtures thereof. They also include, but are not limited to, dialkylquarternary amines such as dicetyldimethylammonium chloride, dicocodimethylammonium chloride, distearyldimethylammonium chloride, and the like, and mixtures thereof. They also include trimethylquaternary amines, alkyl dimethyl benzyl quaternary ammonium salts, dialkyl dimethyl quaternary ammonium salts, and the like, and mixtures thereof. When employing an alkyl chain, the alkyl chain length on the surfactant may range from 6 to 24 carbon atoms.

The nonionic surfactants include, but are not limited to, alkanolamides, alkoxylated alcohols, alkoxylated alkylphenols, alkoxylated ethers, alkoxylated alkyls, alkyl glucosides, amine oxides (e.g., alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides), alkoxylated amides, alkoxylated acids such as fatty acids, alkoxylated amines such as fatty amines, alkoxylated alkyl amines (e.g., cocoalkyl amine ethoxylate), alkoxylated alkyamides, alkyl phenyl polyethoxylates, lecithin, hydroxylated lecithin, fatty acid esters, glycerol esters and their ethoxylates, polyalkoxylated glycerides, glycol esters and their ethoxylates, esters of propylene glycol, sorbitan, sorbitan derivatives such as sorbitan esters and polyalkoxylated sorbitan esters (e.g., polysorbates), ethoxylated sorbitan and derivatives, polyglycosides, polyethylene glycol esters and diesters and the like, and mixtures thereof. Nonionic surfactants may also include the polyoxyethylene surfactants, such as ethoxylated alkyl phenols and ethoxylated aliphatic alcohols, polyethylene glycol esters of fatty acids, and polyoxyethylene esters of fatty acids. When employing an alkyl chain, the alkyl chain length on the surfactant may range from 6 to 24 carbon atoms.

In one embodiment, the nonionic surfactant may be a polysorbate. In general, a polysorbate includes pegylated sorbitans esterified with a fatty acid. The polysorbates include, but are not limited to, a polyoxyethylene sorbitan monolaurate, a polyoxyethylene sorbitan monopalmitate, a polyoxyethylene sorbitan monostearate, a polyoxyethylene sorbitan monooleate, and the like, and mixtures thereof. In one embodiment, the polysorbates may comprise from 5 to 40 oxyethylene repeat units, such as from 10 to 30 repeat units, such as from 15 to 25 repeat units, such as 20 repeat units. The sorbitans and polysorbantes may include sorbitan monooleate, sorbitan monolaurate, sorbitan palmitate, sorbitan monostreate, and the like, and mixtures thereof.

In one embodiment, the nonionic surfactant may have a hydrophilic/lipophilic balance of from about 5 to about 15.

The amphoteric/zwitterionic surfactants include, but are not limited to, betaines, sultaines, hydroxysultaines, alkyliminoacetates, iminodialkanoates, aminoalkanoates, amphoacetates, and amphopropionates, and mixtures thereof. These include alkyl amphoacetates and amphodiacetates, alkyliminoacetates, alkyl amphoproprionates and amphodipropionates, alkyliminodiproprionate, alkyl betaines, alkylamido propyl betaines, alkylampho acetates, alkylamidopropyl hydroxysultaines, iminodialkanoates and aminoalkanoates, sodium 3-dodecyl-aminopropionate, sodium 3-dodecylamino-propane sulfonate, N-higher alkyl aspartic acids, amphoteric phosphates, such as cocamidopropyl PG-dimonium chloride phosphate, amphoacetates such as disodium lauroamphodiacetate, sodium lauroamphoacetate, alkyl substituted imidazolines such as $C_{10-22}$ alkyl, such as a coco alkyl, and the like and mixtures thereof. When employing an alkyl chain, the alkyl chain length on the surfactant may range from 6 to 24 carbon atoms.

However, it should be understood that the surfactant is not limited to those mentioned above and that any surfactant may be employed. In addition, a combination of surfactants may be employed in the composition.

When provided as a concentrate or in the composition, the surfactant may be present in the composition in an amount of about 0.05 wt. % or more, such as about 1 wt. % or more, such as about 2 wt. % or more, such as about 5 wt. % or more to about 40 wt. % or less, such as about 25 wt. % or less, such as about 15 wt. % or less, such as about 10 wt. % or less. When employed with an aqueous acidic solution, the surfactant may be present in an amount of about 0.01 wt. % or more, such as about 0.1 wt. % or more, such as about 0.25 wt. % or more, such as about 0.5 wt. % or more to about 20 wt. % or less, such as about 10 wt. % or less, such as about 5 wt. % or less, such as about 2 wt. % or less, such as about 1 wt. % or less.

In one embodiment, the corrosion inhibitor composition may include a quaternary phosphonium. For instance, the quaternary phosphonium may have a structure as indicated by Formula VII:

$$(R_1R_2R_3R_4P^+)_n X^{n-} \quad \text{Formula VII}$$

wherein $R_1$, $R_2$, $R_3$, and $R_4$ are independently a $C_{1-20}$ alkyl or hydroxyalkyl, a $C_{2-20}$ alkenyl, a $C_{2-20}$ alkynyl, a $C_{3-8}$ cycloalkyl, an aminoalkyl comprising a $C_{1-20}$ alkyl, or benzyl;

X is an anion selected from the group consisting of a carbonate, a bicarbonate, a halide, a phosphate, a sulfate, an ethosulfate, a citrate, a borate, a nitrate, a $C_{1-20}$ carboxylate, and mixtures thereof; and n designates the number of negative charges of the anion.

In one embodiment, $R_1$, $R_2$, $R_3$, and $R_4$ may independently be a $C_{1-10}$ alkyl or hydroxyalkyl, a $C_{2-10}$ alkenyl, a $C_{2-10}$ alkynyl, a $C_{3-8}$ cycloalkyl, an aminoalkyl comprising a $C_{1-10}$ alkyl, or benzyl. In one embodiment, $R_1$, $R_2$, $R_3$, and $R_4$ may independently be a $C_{1-5}$ alkyl or hydroxyalkyl, a $C_{2-5}$ alkenyl, a $C_{2-5}$ alkynyl, a $C_{3-8}$ cycloalkyl, an aminoalkyl comprising a $C_{1-5}$ alkyl, or benzyl. In one embodiment, $R_1$, $R_2$, $R_3$, and $R_4$ may be an undecyl group, a lauryl group, a tridecyl group, a myristyl group, a pentadecyl group, a cetyl group, a palmitoleyl group, a heptadecyl group, a stearyl group, a nonadecyl group, and the like.

In one embodiment, the anion may be a halide. In one embodiment, the halide may be a fluoride, a chloride, a bromide, or an iodide. In one particular embodiment, the anion may be a halide such as a chloride.

When provided as a concentrate or in the composition, the quaternary phosphonium may be present in the composition in an amount of about 1 wt. % or more, such as about 5 wt. % or more, such as about 15 wt. % or more, such as about 30 wt. % or more to about 60 wt. % or less, such as about 50 wt. % or less, such as about 25 wt. % or less, such as about 10 wt. % or less, such a about 5 wt. % or less. When employed with an aqueous acidic solution, the quaternary phosphonium may be present in an amount of about 0.01 wt. % or more, such as about 0.1 wt. % or more, such as about 0.2 wt. % or more, such as about 0.5 wt. % or more to about 20 wt. % or less, such as about 10 wt. % or less, such as about 5 wt. % or less, such as about 2.5 wt. % or less.

In one embodiment, the corrosion inhibitor composition may comprise a solvent. For instance, the solvent may aid with the delivery of the composition and/or provide the desired viscosity, stability, etc. In one embodiment, the solvent may be water. In another embodiment, the solvent may be an organic solvent. In another embodiment, the solvent may be a combination of water and an organic solvent.

The organic solvent may include, but is not limited to, polar aprotic solvents, aromatic solvents, alcohols, glycols and derivatives such as glycol ethers, water-soluble esters, ketones, and the like. For instance, these solvents may include, but are not limited to, methanol, ethanol, 1-propanol, isopropanol, butanol including n-butanol, isobutanol, and tert-butanol, pentanol, hexanol, ethylene glycol, propylene glycol, diethylene glycol, dipropylene glycol, polyethylene glycol, polypropylene glycol, polyethylene glycol-polyethylene glycol block copolymers, 2-methoxyethanol, diethylene glycol monomethyl ether, ethylene glycol monobutyl ether, butyl diglycol ether, water/oil-soluble $C_2$-$C_{10}$ esters, and water/oil-soluble $C_2$-$C_{10}$ ketones, cyclohexanone, diisobutylketone, N,-methylpyrrolidinone, N,N-dimethylformamide, pentane, hexane, cyclohexane, methylcyclohexane, heptane, decane, dodecane, and the like. The polar aprotic solvents may also include N,N-dimethyl formamide, dimethylsulfoxide, dimethylacetamide, 1-methyl-2-pyrrolidone, tetramethylene sulfone, acetone, formamide, acetonitrile, and the like. The aromatic solvents may include aromatic naphta, xylene, toluene, and the like.

In one embodiment, the solvent may include water, propylene glycol, dipropylene glycol, methanol, or a mixture thereof.

However, it should be understood that the organic solvent is not limited to those mentioned above and that any organic solvent may be employed. In addition, a combination of organic solvents may be employed in the composition.

When provided as a concentrate or in the composition, the solvent may be present in the composition in an amount of from about 1 wt. % or more, such as about 5 wt. % or more, such as about 10 wt. % or more, such as about 25 wt. % or more, such as about 50 wt. % or more to about 95 wt. % or less, such as about 75 wt. % or less, such as about 50 wt. % or less, such as about 30 wt. % or less. When employed with an aqueous acidic solution, the solvent may be present in an amount of about 0.01 wt. % or more, such as about 0.1 wt. % or more, such as about 0.25 wt. % or more, such as about 0.5 wt. % or more to about 40 wt. % or less, such as about 20 wt. % or less, such as about 10 wt. % or less, such as about 5 wt. % or less, such as about 2 wt. % or less, such as about 1 wt. % or less.

In addition to the above, other components commonly employed in corrosion inhibitor compositions may be employed. For example, these may include, but are not limited to, iron control agents, foaming agents, anti-sludge agents, gelling agents, clay stabilizers, viscosifiers, wetting agents, oxygen scavengers, stabilizers, scale inhibitors, salts, pH control additives, friction reducers, other biocides, sulfide scavengers, buffers, fluid-loss additives, catalysts, clay control agents, antifoam agents, flocculants, carbon dioxide scavengers, oxidizers, breakers, breaker aids, water clarifiers, asphaltene inhibitors, paraffin inhibitors, relative permeability modifiers, particulates, and the like. Such agents may be present in the composition in an amount of from about 0.01 wt. % to about 20 wt. %, such as from about 0.1 wt. % to about 10 wt. %, such as from about 0.1 wt. % to about 5 wt. %.

The corrosion inhibitor composition may be prepared or mixed using any technique known in the art. For instance, as one example, the components may be mixed simultaneously. As another example, the nitrogen containing heteroaromatic compound may be mixed first with the haloalkynyl carbamate compound. Thereafter, additional components such as a solvent, a surfactant, an alkynol, etc. may be added to the mixture. Further, the corrosion inhibitor composition may be premixed, prepackaged, and transported to a site, such as a well site, for use.

The corrosion inhibitor composition may be employed for treatment using various techniques. In acidizing treatments, in general, an acid solution, such as an aqueous acidic solution, is employed for the acid stimulation. The treating acid solution may include, but is not limited to, hydrochloric acid, hydrofluoric acid, acetic acid, formic acid, or other organic acids and anhydrides, and mixtures thereof. In addition, these acids may be presented as aqueous acidic solutions comprising water. The treating acid may include any other acids also known to those of skill in the art.

Accordingly, the corrosion inhibitor composition may be combined with or mixed into the treating acid solution, such as the aqueous acid solution. The composition may be introduced in an amount sufficient to provide protection against or inhibit corrosion. However, it should be understood that the amount of the corrosion inhibitor composition varies depending on the system in which the ingredients are used. For instance, the concentration may depend on the temperature of the well, the exposure time to the acid solution, the type of acid, the type of formation, the depth of the formation, the type of surface, etc. Methods for monitoring corrosion are well known in the art thereby allowing one to adjust the concentration of the corrosion inhibitor composition.

When combined with or mixed into the treating acid solution, the corrosion inhibitor composition may be present in an amount of from about 0.01 wt. % or more, such as about 0.1 wt. % or more, such as about 0.2 wt. % or more to about 30 wt. % or less, to about 20 wt. % or less, such as about 10 wt. % or less, such as about 5 wt. % or less, such as about 4 wt. % or less, based on the weight of the treating acid solution or aqueous acidic solution.

As mentioned, the corrosion inhibitor composition may be employed for inhibiting corrosion on a surface. These surfaces may include metallic surfaces such as steel surfaces. The steel surfaces may include carbon steels, alloy steels such as stainless steels, and tool steels. The carbon steels may include low carbon, medium carbon, high carbon, and very high carbon steels as generally defined in the art. The alloy steels may include austenitic steels, ferritic steels, and martensitic steels. The alloy steels may include those with silicon, nickel, titanium, copper, manganese, chromium, and aluminum in varying proportions. The tool steels may include tungsten, molybdenum, cobalt, and vanadium in varying proportions. The surface may include other metals or alloys comprising aluminum, steel, stainless steel, brass, bronze, carbon steel, copper, ferrous materials, iron, magnesium, nickel, titanium, or zinc, or a combination thereof.

Without intending to be limited by theory, the corrosion inhibitor composition may form a layer or film on the surface to prevent or inhibit the acid of the acidizing treatment or other corrosive agents, such as hydrogen sulfide, from corroding the surface.

In this regard, the present disclosure is also directed to a method of inhibiting corrosion on a surface, such as a metal surface. The method comprises contacting a surface, such as a metal surface, with a corrosion inhibitor composition, as disclosed herein. In one embodiment, the corrosion inhibitor agent may be combined with an aqueous acidic solution.

When applying an acid treatment during acid stimulation, the permeability of subterranean formations is increased thereby allowing oil, gas, and/or water to enter into the well. These subterranean formations may be of any nature. For instance, they may be a sandstone or a carbonate formation. Sandstone formations contain siliceous materials, like quartz as the major constituent and in addition may contain various amounts of clays (aluminosilicates such as kaolinite or illite) or alkaline aluminosilicates such as feldspars, and zeolites, as well as carbonates (calcite, dolomite, ankerite) and iron based minerals (hematite and pyrite). Carbonate formations contain calcium carbonates as the major constituent (calcite and dolomite).

The corrosion inhibitor composition may have utility during acidizing treatments for hydrocarbon wells, such as those in the oil and gas industries, as well as non-hydrocarbon wells, such as water wells and geothermal wells. In these applications, the corrosion inhibitor composition may provide corrosion inhibition to equipment including casings, tubings, and other well components such as wellhead fittings, connections, meters, storage tanks, flow lines, etc. Further, the corrosion inhibitor composition may also be used in other industrial settings to inhibit corrosion of tanks, process lines, pumps, heaters, boilers, cooling towers, and other industrial equipment.

While acidizing treatments and acid stimulation are mentioned, it should be noted that the corrosion inhibitor composition may have multiple uses. For instance, the corrosion inhibitor composition may have applications relating to the production, transportation, storage, and separation of oil and gas. Additionally, the corrosion inhibitor composition may be employed for other processes such as pickling a tubular, cleaning a wellbore, acid tunneling, drilling mud removal, and scale treatment.

The present disclosure may be better understood with reference to the following example.

EXAMPLES

The examples of the invention are given below by way of illustration and not by way of limitation. The following experiments were conducted in order to show some of the benefits and advantages of the present invention.

In the examples, the corrosion rate was determined as generally conducted in the art. In particular, the following calculation was employed:

$$\text{Corrosion Rate} = 87.6 * (W)/[(D)(A)(T)]$$

In the aforementioned equation, the Corrosion Rate is provided in units of mpy, W is the weight loss of the sample (e.g., coupon) in milligrams obtained by measuring an initial weight before exposure and a final weight after exposure, D is the density of the metal in g/cm$^3$, A is the area of the sample exposed in cm$^2$, T is the time of exposure in hrs, and 87.6 is a unit conversion factor.

Example 1

The corrosion rates of 316 SS metal coupons were tested when exposed to an alkyl pyridine derivative and 3-iodo-2-propynyl-N-butylcarbamate ("IPBC") individually and as a mixture at a weight ratio of 7.2:1 (w/w) in a methanol solvent. Solutions of 15% hydrochloric acid were dosed with the indicated concentrations of the various components.

The initial weight of the coupons was obtained. Thereafter, the coupons were added to the acid solution and exposed to temperatures of 80° C. for four hours, after which the coupons were removed, rinsed, cleaned, and weighed in order to calculate the corrosion rates.

As indicated in the table below, when providing an inhibitor composition of both an alkyl pyridine derivative and IPBC, the corrosion rate is reduced significantly relative to the individual components. In particular, the table demonstrates the effectiveness of the corrosion inhibitor composition and the synergistic effect achieved when employing the nitrogen containing heteroaromatic compound in combination with the haloalkynyl carbamate compound.

The formulations and calculated corrosion rates are shown below along with the concentration when dosed into the hydrochloric acid solution.

| Formulation | IPBC (ppm) | Alkyl Pyridine Derivative B (ppm) | Total Active Concentration (ppm) | Corrosion Rate (mpy) |
|---|---|---|---|---|
| Comparative Sample 1 | 10 | — | 10 | 15,264 |
| Comparative Sample 2 | — | 80 | 80 | 570 |
| Sample 1 | 10 | 72 | 82 | 240 |

Example 2

The corrosion rates of C1018 steel coupons were tested when exposed to solutions of 28% hydrochloric acid with the indicated concentrations of the various components. As an example, 1.75 g of the alkyl pyridine derivative (20 wt. % actives) was combined with 0.70 g of 3-iodo-2-propynyl N-butylcarbamate (20 wt. % actives) in isopropanol and dosed into the acid solution.

The initial weight of the coupons was obtained. The coupons were added to the acid solution and exposed to a temperature of 80° C. for four hours, after which the coupons were removed, cleaned, and weighed in order to calculate the corrosion rates of the blends.

In particular, the table demonstrates the effectiveness of the corrosion inhibitor composition and the synergistic effect over a wide range of inhibitor ratios.

The formulations and calculated corrosion rates are shown below along with the concentration when dosed into the hydrochloric acid solution.

| | Formulation Ratio (w/w) | | | | | |
|---|---|---|---|---|---|---|
| | 0:1 | 2:1 | 8:1 | 16:1 | 26:1 | 1:0 |
| Alkyl Pyridine Derivative (ppm) | — | 2,333 | 3,111 | 3,294 | 3,370 | 3,500 |
| IPBC (ppm) | 3,500 | 1,167 | 389 | 206 | 130 | — |
| Total Active (ppm) | 3,500 | 3,500 | 3,500 | 3,500 | 3,500 | 3,500 |
| Corrosion Rate (mpy) | | | | | | |
| Alkyl Pyridine Derivative A | — | 241 | 1,890 | 2,629 | 2,155 | 9,338 |
| Alkyl Pyridine Derivative B | — | 174 | 1,381 | 1,889 | 5,270 | 8,197 |
| Alkyl Pyridine Derivative C | — | 98 | 226 | 352 | 651 | 9,309 |
| IPBC | 1,724 | — | — | — | — | — |

Example 3

The corrosion rates of C1018 steel coupons were tested when exposed to solutions of 28% hydrochloric acid. In particular, the examples demonstrated the performance of the inhibitor compositions in combination with a nonionic surfactant. The nonionic surfactant was a sorbitan monooleate.

Solutions of 28% hydrochloric acid were dosed with the indicated concentrations of the alkyl pyridine derivative and optionally, the nonionic surfactant and/or IPBC via pre-mixed formulations on a w/w basis. As an Example, Sample 3 contains 4.01 g of alkyl pyridine derivative B (80 wt. % actives), 2.01 g of the nonionic surfactant, 0.397 g of IPBC (20 wt. % actives), and 13.61 g of isopropanol. The solution contains 16 wt. % of the alkyl pyridine derivative B, 10 wt. % of the nonionic surfactant, and 0.4 wt. % of IPBC. The composition was dosed at 5% into the hydrochloric acid solution.

The initial weight of the coupons was obtained. The coupons were added to the solutions at temperatures of 80° C. for four hours, after which the coupons were removed, cleaned, and weighed in order to calculate the corrosion rates.

As demonstrated, the nonionic surfactant enhances the corrosion inhibition of the composition.

The formulations and calculated corrosion rates are shown below along with the concentration when dosed into the hydrochloric acid solution.

| Formulation | Alkyl Pyridine Derivative B (ppm) | IPBC (ppm) | Total Active Concentration (ppm) | Nonionic Surfactant (ppm) | Corrosion Rate (mpy) |
|---|---|---|---|---|---|
| Comparative Sample 3 | 8,000 | — | 8,000 | — | 3,576 |
| Sample 2 | 8,000 | 200 | 8,200 | — | 650 |
| Comparative Sample 4 | 8,000 | — | 8,000 | 5,000 | 2,826 |
| Sample 3 | 8,000 | 200 | 8,200 | 5,000 | 315 |

Example 4

The corrosion rates of C1018 steel coupons were tested when exposed to solutions of 28% hydrochloric acid. In particular, the examples demonstrated the performance of the inhibitor compositions in combination with an alkynol.

The alkynol was 2,5-dimethylhex-3-yne-2,5-diol. The nonionic surfactant was a sorbitan monooleate.

Solutions of 28% hydrochloric acid were dosed with the indicated concentrations of the alkyl pyridine derivative, and optionally, the nonionic surfactant, IPBC, and/or the alkynol. As an example, Sample 4 contained 2.67 g of alkyl pyridine derivative B (75 wt. % actives), 2.93 g of 2,5-dimethylhex-3-yne-2,5-diol (70 wt. % solution), 2.04 g of the nonionic surfactant, 0.397 g of IPBC (20 wt. % actives), and 12.09 g isopropanol. The solution contains 10 wt. % of the alkyl pyridine derivative B, 10 wt. % of alkynol, 10 wt. % of the nonionic surfactant, and 0.4 wt. % of IPBC. The composition was dosed at 3.33% into the hydrochloric acid solution.

The initial weight of the coupons was obtained. The coupons were added to the acid solution and exposed to a temperature of 80° C. for four hours, after which the coupons were removed, cleaned, and weighed in order to calculate the corrosion rates.

As demonstrated, the alkynol enhances the corrosion inhibition of the composition. Further, the quaternary combination was more effective than the alkyl pyridine derivative employed alone or the tertiary combination of the pyridine derivative, IPBC, and nonionic surfactant.

The formulations and calculated corrosion rates are shown below along with the concentration when dosed into the hydrochloric acid solution.

|  | Formulation | | |
| --- | --- | --- | --- |
|  | Sample 4 | Sample 5 | Comparative Sample 5 |
| Alkyl Pyridine Derivative B (ppm) | 3,333 | 6,666 | 9,750 |
| IPBC (ppm) | 131 | 131 | — |
| Total Active Concentration (ppm) | 3,464 | 6,797 | 9,750 |
| 2,5-dimethylhex-3-yne-2,5-diol (ppm) | 3,333 | — | — |
| Nonionic Surfactant (ppm) | 3,333 | 3,333 | — |
| Total Concentration (ppm) | 10,130 | 10,130 | 9,750 |
| Corrosion Rate (mpy) | 295 | 428 | 1,654 |

Example 5

The corrosion rates of C1018 steel coupons were tested when exposed to solutions of 28% hydrochloric acid. In particular, the examples demonstrated the performance of the inhibitor compositions in combination with an amphoteric surfactant. The amphoteric surfactant was a coco-substituted imidazoline.

Solutions of 28% hydrochloric acid were dosed with the indicated concentrations of the alkyl pyridine derivative and amphoteric surfactant via pre-mixed formulations on a w/w basis. As an example, Samples 6 and 7 contain 6.68 g of alkyl pyridine derivative D (100 wt. % actives), 4.18 g of the amphoteric surfactant (40 wt. % solution), and 9.16 g isopropanol. The solution contains 33 wt. % of alkyl pyridine derivative D and 8.3 wt. % of the amphoteric surfactant. The compositions were dosed at 1% into the hydrochloric acid solution.

As another example, Sample 8 contains, 5.01 g of alkyl pyridine derivative D (100 wt. % actives), 5.01 g of 2,5-dimethylhex-3-yne-2,5-diol (70 wt. % solution), 4.02 g of the amphoteric surfactant (40 wt. % solution), 1.01 g of IPBC (20 wt. % actives), and 5.20 g of isopropanol. The solution contains 25 wt. % alkyl pyridine derivative D, 17 wt. % of 2,5-dimethylhex-3-yne-2,5-diol active, 8 wt. % of the amphoteric surfactant, and 1 wt. % of IPBC. The composition was dosed at 0.93 wt. % into the hydrochloric acid solution.

The initial weight of the coupons was obtained. The coupons were added to the solutions at temperatures of 80° C. for four hours, after which the coupons were removed, cleaned, and weighed in order to calculate the corrosion rates.

As demonstrated, the amphoteric surfactant enhances the corrosion inhibition of the alkyl pyridine derivative alone and when included within the inhibitor composition.

The formulations and calculated corrosion rates are shown below along with the concentration when dosed into the hydrochloric acid solution.

|  | Formulation | |
| --- | --- | --- |
|  | Comparative Sample 6 | Sample 6 |
| Alkyl Pyridine Derivative D (ppm) | 5,000 | 3,333 |
| Total Active Concentration (ppm) | 5,000 | 3,333 |
| Amphoteric Surfactant (ppm) | — | 834 |
| Total Concentration (ppm) | 5,000 | 4,167 |
| Corrosion Rate (mpy) | 18,878 | 10,531 |

|  | Formulation | | |
| --- | --- | --- | --- |
|  | Comparative Sample 7 | Sample 7 | Sample 8 |
| Alkyl Pyridine Derivative D (ppm) | 5,000 | 3,333 | 2,301 |
| IPBC (ppm) | — | — | 100 |
| Total Active Concentration (ppm) | 5,000 | 3,333 | 2,401 |
| Amphoteric Surfactant (ppm) | — | 834 | 794 |
| 2,5-dimethylhex-3-yne-2,5-diol (ppm) | — | — | 1,732 |
| Total Concentration (ppm) | 5,000 | 4,167 | 4,927 |
| Corrosion Rate (mpy) | 18,878 | 10,531 | 813 |

Example 6

The corrosion rates of C1018 steel coupons were tested when exposed to solutions of 15% hydrochloric acid. In particular, the acid was dosed with either propargyl alcohol or an inhibitor composition as disclosed in Sample 9. The dosages were 2%, 1%, 0.5%, and 0.25%. The nonionic surfactant was a sorbitan monooleate. The solvent was a combination of water and ethylene glycol.

As an example, Sample 9 contains 4.0 g of alkyl pyridine derivative E (75 wt. % actives), 0.4 g of the nonionic surfactant, and 2.0 g of IPBC (30 wt. % actives). The solution contains 47 wt. % of the alkyl pyridine derivative D, 6.3 wt. % of the nonionic surfactant, and 9.4 wt. % of IPBC.

C1018 steel coupons were pre-weighed and added to the inhibited acid solutions and placed into an autoclave partially filled with heat transfer fluid. The autoclave was sealed and flushed with nitrogen gas with a residual pressure of 50 psi left in the vessel. The autoclave was heated to 120° C. over the course of approximately one hour and was held at temperature for 4 hours. The autoclave was then allowed to cool for approximately two hours and the coupons were removed from the acid solutions, cleaned, and weighed a second time.

The formulations and calculated corrosion rates are shown below along with the concentration when dosed into the hydrochloric acid solution.

| Formulation | Sample 9 |
|---|---|
| Alkyl Pyridine Derivative E (wt. %) | 62.5% |
| Nonionic Surfactant (wt. %) | 6.3% |
| IPBC (wt. %) | 10.4% |
| Solvent (wt. %) | 20.8% |

| | | Concentration in Solution (wt. %) | | | |
|---|---|---|---|---|---|
| | | 2% | 1% | 0.50% | 0.25% |
| Corrosion Rate (mpy) | Propargyl Alcohol | 254 | 171 | 256 | 54,878 |
| | Sample 9 | 427 | 447 | 1,255 | 4,195 |

Example 7

The corrosion rates of C1018 steel coupons were tested when exposed to solutions of 15% hydrochloric acid. In particular, the acid was dosed with the inhibitor composition as disclosed in Samples 10-12 at 1%. The solvent was a combination of water and ethylene glycol.

As an example, Sample 10 contained 4.0 g of the alkyl pyridine derivative E (75 wt. % actives), 0.4 g of a surfactant, 1.0 g of IPBC (30 wt. % actives), and 1.0 g of 3-butyn-2-ol. The solution contains 47 wt. % of the alkyl pyridine E, 6.3 wt. % of the surfactant, 4.7 wt. % of IPBC, and 16 wt. % of 3-butyn-2-ol. The composition was dosed at 1% into the hydrochloric acid solution.

C1018 steel coupons were pre-weighed and added to the acid solutions with the compositions and placed into an autoclave partially filled with heat transfer fluid. The autoclave was sealed and flushed with nitrogen gas with a residual pressure of 50 psi left in the vessel. The autoclave was heated to 120° C. over the course of approximately one hour and was held at temperature for 4 hours. The autoclave was then allowed to cool for approximately two hours and the coupons were removed from the acid solutions, cleaned, and weighed a second time.

The formulations and calculated corrosion rates are shown below along with the concentration when dosed into the hydrochloric acid solution.

| | Formulation | | |
|---|---|---|---|
| | Sample 10 | Sample 11 | Sample 12 |
| Alkyl Pyridine Derivative E (wt. %) | 47 | 30 | 12 |
| Surfactant (wt. %) | 6 | 4 | 2 |
| IPBC (wt. %) | 5 | 5 | 5 |
| Solvent (wt. %) | 26 | 21 | 15 |
| 3-butyn-2-ol (wt. %) | 16 | 40 | 66 |

| | Formulation | | |
|---|---|---|---|
| | Sample 10 | Sample 11 | Sample 12 |
| Alkyl Pyridine Derivative E (ppm) | 4,688 | 3,000 | 1,230 |
| IPBC (ppm) | 469 | 480 | 492 |
| Total Active Concentration (ppm) | 5,157 | 3,480 | 1,722 |
| Surfactant (ppm) | 625 | 400 | 164 |
| Solvent (ppm) | 2,540 | 2,100 | 1,476 |
| 3-butyn-2-ol (ppm) | 1,563 | 4,000 | 6,557 |
| Total Concentration (ppm) | 9,885 | 9,980 | 9,919 |
| Corrosion Rate (mpy) | 377 | 328 | 222 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part.

Furthermore, those of ordinary skill in the art will appreciate that the foregoing description is by way of example only, and is not intended to limit the invention so further described in such appended claims.

The invention claimed is:

1. A composition for inhibiting corrosion, the composition comprising
    at least one quaternized nitrogen containing heteroaromatic compound, and
    at least one haloalkynyl carbamate compound,
    wherein the weight ratio of the at least one nitrogen containing heteroaromatic compound to the at least one haloalkynyl carbamate compound is from 1:100 to 100:1, and
    wherein the at least one nitrogen containing heteroaromatic compound is a pyridine.

2. The composition according to claim 1, wherein the at least one nitrogen containing compound is substituted with a $C_{1-20}$ alkyl group.

3. The composition according to claim 1, wherein the at least one nitrogen containing heteroaromatic compound comprises at least one nitrogen ring atom, wherein the at least one nitrogen ring atom has a substituent group selected from the group consisting of an alkyl group, an alkenyl group, an aryl group, an arylalkyl group, an alkaryl group, a heteroaryl group, a heteroarylalkyl group, and an alkylheteroaryl group.

4. The composition according to claim 3, wherein the substituent group is an arylalkyl group comprising an aryl group containing from 5 to 9 carbon atoms and a $C_{1-5}$ alkyl group.

5. The composition according to claim 1, wherein the at least one haloalkynyl carbamate compound has the following structure:

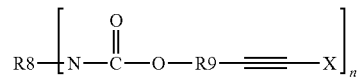

wherein
    R8 is a hydrogen, an alkyl group, an alkenyl group, an alkynyl group, an aryl group, an arylalkyl group, an alkaryl group, a heteroaryl group, a heteroarylalkyl group, an alkylheteroaryl group, a cycloalkyl group, an aminoalkyl group, or a hydroxyalkyl group;

R9 is an alkylene group,

X is a halide; and n is from 1 to 3.

6. The composition according to claim 1; wherein the at least one haloalkynyl carbamate compound is 3-iodo-2-propynyl butyl carbamate.

7. The composition according to claim 1, wherein the weight ratio of the at least one nitrogen containing heteroaromatic compound to the at least one haloalkynyl carbamate compound is from 1:50 to 50:1.

8. The composition according to claim 1, wherein the composition further comprises an alkynol.

9. The composition according to claim 8, wherein the alkynol is 2,5-dimethyl-3-hexyne-2,5-diol, a butynol, or a combination thereof.

10. The composition according to claim 1, wherein the composition further comprises a weak base.

11. The composition according to claim 1, wherein the composition further comprises a quaternary phosphonium halide.

12. The composition according to claim 1, wherein the composition further comprises a biocide.

13. The composition according to claim 1, wherein the composition further comprises at least one solvent.

14. The composition according to claim 13, wherein the solvent comprises water, an organic solvent, or a combination thereof.

15. The composition according to claim 14, wherein the organic solvent comprises methanol, ethanol, propanol, isopropanol, butanol, isobutanol, pentanol, hexanol, ethylene glycol, propylene glycol, diethylene glycol, dipropylene glycol, polyethylene glycol, polypropylene glycol, diethylene glycol monomethyl ether, ethylene glycol monobutyl ether, butyl diglycol ether, or a combination thereof.

16. The composition according to claim 1, wherein the at least one nitrogen containing heteroaromatic compound and the at least one haloalkynyl carbamate compound have a total active concentration of from about 5 wt. % to about 100 wt. %.

17. A method of inhibiting corrosion on a surface, the method comprising contacting the surface with the composition according to claim 1.

18. The method according to claim 17, wherein the surface is a steel surface.

19. The method according to claim 17, the method further comprising mixing the composition with an aqueous acidic solution.

20. The method according to claim 19, wherein the aqueous acidic solution comprises hydrochloric acid, hydrofluoric acid, acetic acid, citric acid, or a combination thereof.

21. The method according to claim 17, the method further comprising introducing the composition into an oil well, a gas well, or a water well.

22. The composition according to claim 8, wherein the alkynol comprises ethyl octynol.

23. The composition according to claim 8, wherein the alkynol comprises propargyl alcohol.

24. The composition according to claim 1, wherein the composition further comprises a surfactant.

25. The composition according to claim 24, wherein the surfactant is a nonionic surfactant, an amphoteric surfactant, or a combination thereof, and wherein the surfactant has a hydrophilic/lipophilic balance of from about 5 to about 15.

26. The composition according to claim 24 wherein the surfactant is a polysorbate, a sorbitan, a sorbitan derivative, or a combination thereof.

27. A composition for inhibiting corrosion, the composition comprising at least one quaternized nitrogen containing heteroaromatic compound, and at least one haloalkynyl carbamate compound, and wherein the weight ratio of the at least one nitrogen containing heteroaromatic compound to the at least one haloalkynyl carbamate compound is from 1:100 to 100:1, wherein the at least one nitrogen containing heteroaromatic compound is a pyridine, and wherein the at least one haloalkynyl carbamate compound is 3-iodo-2-propynyl butyl carbamate.

* * * * *